June 5, 1956  J. LATZEN  2,749,161
BALL AND SOCKET JOINT
Filed Aug. 15, 1950

INVENTOR.
JOSEPH LATZEN
BY Robert H. Jacob
AGENT

2,749,161

BALL AND SOCKET JOINT

Josef Latzen, Dusseldorf-Oberkassel, Germany, assignor to the firm A. Ehrenreich & Cie., Dusseldorf-Oberkassel, Germany Application August 15, 1950, Serial No. 179,529

5 Claims. (Cl. 287—90)

My invention relates to an improved ball and socket joint for all purposes, in particular for guide and steering bars, the ball head of one joint rod being supported in the joint housing by dish-shaped bearing surfaces.

Object of the present invention is to provide an exactly fitted ball and socket joint the production costs of which are considerably reduced.

The ball and socket joints which are generally used comprise two ball bearing shells in the housing for supporting the ball head of the joint rod. The surfaces of the ball bearing shells have to be fitted exactly to the ball head as well as to the inner walls of the housing. Exact fit requires very much time and makes the manufacture of those ball and socket joints expensive.

According to the present invention the conventional ball bearing shells are displaced by an elastically loaded spring shell ring having a spherical inner surface adapted to enclose a ball head in an open ended cylindrical chamber defined by a housing in clearance fit. The spring shell ring enables greater tolerance of the ball head. After placing the spring shell ring on the ball head and snapping in it will be simple to finish the external surface of the spring shell ring by grinding.

For absorbing and cushioning vertical strains the spring shell ring can be loaded by a spring or springs. A thin-walled bush forming a wear lining may be arranged intermediate the inner wall of the housing and the spring shell ring in order to protect the housing from wear caused by movement of the spring shell ring.

By way of example, vertical sections of preferred embodiments of the invention are shown in the accompanying drawing.

Figure 1:
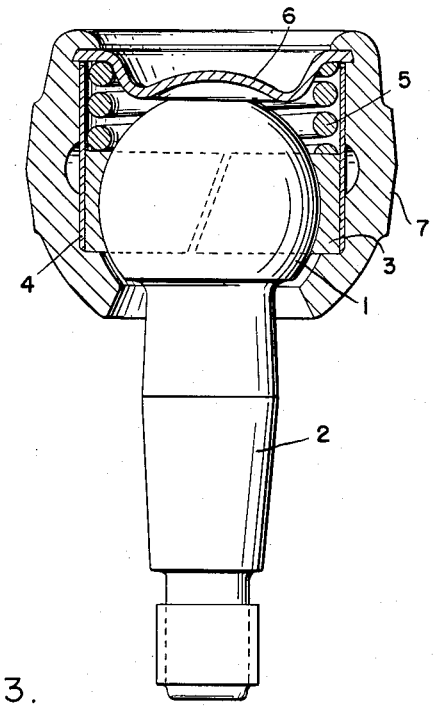
Fig. 1 is a section of an embodiment showing a split spring shell ring biased at the top.

Referring particularly to the mentioned drawing a ball head 1 of a joint rod 2 is enclosed by a slit spring shell ring 3 having been brought into its position by pulling over and snapping on. A thin-walled bush 4 encloses the spring shell ring 3 thus forming a wear lining intermediate the latter and the inner wall of the housing 7. The spring shell ring 4 resting upon the bottom of the housing 7 is loaded by a spring 5 being supported by a closure cap 6.

Figures 2, 3:
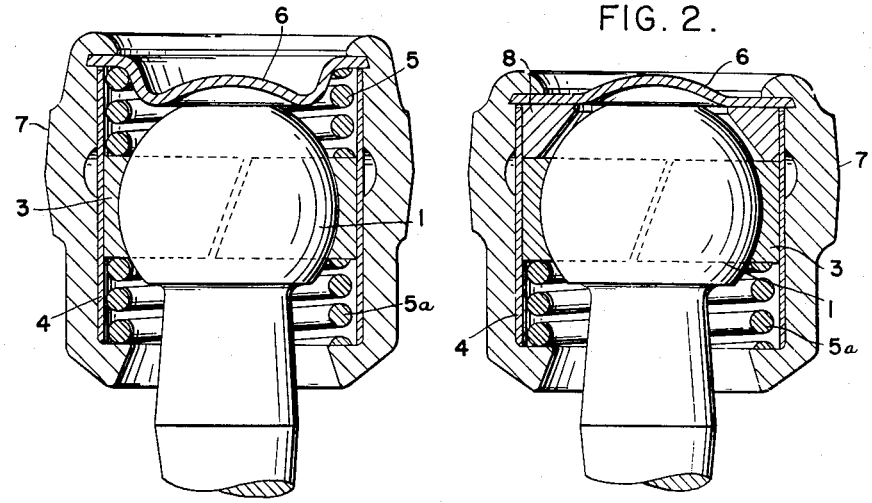
Fig. 2 is a section of a different embodiment where the split ring shell is spring biased at the bottom.
Fig. 3 illustrates an embodiment where the shell is spring biased both, at top and bottom.

Modifications of the ball and socket joint may be made, for instance, by elastically supporting the spring shell ring as in Fig. 2 with a spring 5a on its bottom side against a ring 8 constituting a shoulder at the top as in Fig. 2 or on both its upper and bottom sides by springs 5 and 5a as in Fig. 3.

Various structural changes and modifications may be made in ball and socket joints for all purposes as shown and described, without departing from the spirit and the salient ideas of this invention.

What I claim is:

1. A ball and socket joint adapted particularly for guide and steering bars comprising a housing defining an open ended cylindrical chamber, a closure cap secured to said housing to close one end of said chamber, a rod projecting freely within the other end of said chamber for angular movement therein and provided with a ball end enclosed by said housing, a cylindrical bushing constituting a wear lining disposed adjacent the walls of said chamber, bearing means comprising a unitary split spring shell ring extending substantially around the center portion of the periphery of said ball end and having an inner surface of spherical conformation in engagement with said ball end and an outer surface of cylindrical conformation in engagement with said bushing, and spring means arranged within said chamber and extending between one end of said housing and an edge of said bearing means, said spring means biasing said bearing means to a given position in said chamber.

2. A ball and socket joint adapted particularly for guide and steering bars comprising a housing defining an open ended cylindrical chamber, a closure cap secured to said housing to close one end of said chamber, a rod projecting freely within the other end of said chamber for angular movement therein and provided with a ball end enclosed by said housing, an inturned flange provided on said housing within said chamber at said other end thereof, a cylindrical bushing constituting a wear lining disposed adjacent the walls of said chamber, bearing means comprising a unitary split spring shell ring extending substantially around the center portion of the periphery of said ball end and having an inner surface of spherical conformation in engagement with said ball end and an outer surface of cylindrical conformation in engagement with said bushing, and spring means arranged within said chamber and extending between one end of said housing and an edge of said bearing means for biasing said bearing means against said inturned flange, said spring means retaining said bearing means in a given position on said ball end of said rod and against said inturned flange.

3. A ball and socket joint adapted particularly for guide and steering bars comprising a housing defining an open ended cylindrical chamber, a closure cap secured to said housing to close one end of said chamber, a rod projecting freely within the other end of said chamber for angular movement therein and provided with a ball end enclosed by said housing, an inturned flange provided on said housing within said chamber at said other end thereof, a cylindrical bushing constituting a wear lining disposed adjacent the walls of said chamber, bearing means comprising a unitary split spring shell ring extending substantially around the center portion of the periphery of said ball end and having an inner surface of spherical conformation in engagement with said ball end and an outer surface of cylindrical conformation in engagement with said bushing, and spring means arranged within said chamber and extending between said closure cap and an edge of said bearing means for biasing said bearing means against said inturned flange, said spring means retaining said bearing means against said flange.

4. A ball and socket joint adapted particularly for guide and steering bars comprising a housing defining an open ended cylindrical chamber, a closure cap secured to said housing to close one end of said chamber, a rod projecting freely within the other end of said chamber for angular movement therein and provided with a ball end enclosed by said housing, means comprising a shoulder arranged to extend within the closed end of said cylindrical chamber, a cylindrical bushing constituting a wear lining disposed adjacent the walls of said chamber, an inturned flange provided on said housing within said chamber at said other end, bearing means comprising a unitary split spring shell ring extending substantially around the center portion of the periphery of said ball end and having an inner surface of spherical conformation in engagement with said ball end and an outer surface of cylindrical conformation in engagement with said bushing, and spring means arranged within said chamber and extending between said inturned flange and an edge of said bearing means for biasing said bearing means against said shoulder, said spring means retaining said bearing means against said shoulder.

5. A ball and socket joint adapted particularly for guide and steering bars comprising a housing defining an open ended cylindrical chamber, a closure cap secured to said housing to close one end of said chamber, a rod projecting freely within the other end of said chamber for angular movement therein and provided with a ball end enclosed by said housing, an inturned flange provided on said housing within said chamber at said other end thereof, a cylindrical bushing constituting a wear lining disposed adjacent the walls of said chamber, bearing means comprising a unitary split spring shell ring extending substantially around the center portion of the periphery of said ball end and having an inner surface of spherical conformation in engagement with said ball end and an outer surface of cylindrical conformation in engagement with said bushing, a first helical spring arranged within said chamber and extending between said closure cap and a first edge of said bearing means, and a second helical spring arranged within said chamber and extending between said flange and a second edge of said bearing means, said springs biasing said bearing toward the center of said chamber and retaining said bearing means in a given position.

References Cited in the file of this patent

UNITED STATES PATENTS

| 1,324,396 | Heath | Dec. 9, 1919 |
| 1,645,247 | Loock | Oct. 11, 1927 |
| 2,426,358 | Klages et al. | Aug. 26, 1947 |
| 2,451,060 | Booth | Oct. 12, 1948 |

FOREIGN PATENTS

| 679,836 | France | Apr. 17, 1930 |